United States Patent [19]

Elkins

[11] Patent Number: 4,898,400
[45] Date of Patent: Feb. 6, 1990

[54] REMOTE OPERATED HITCH APPARATUS WITH SAFETY INTERLOCK

[76] Inventor: Johnny C. Elkins, P.O. Box 2599, San Angelo, Tex. 76900

[21] Appl. No.: 286,707

[22] Filed: Dec. 20, 1988

Related U.S. Application Data

[63] Continuation-in-part of Ser. No. 147,196, Jan. 22, 1988, Pat. No. 4,804,204.

[51] Int. Cl.$^4$ .............................................. B60D 1/06
[52] U.S. Cl. .................................... 280/427; 280/475; 280/512
[58] Field of Search ............... 280/511, 512, 513, 504, 280/427, 431, 475

[56] References Cited

U.S. PATENT DOCUMENTS 3,150,884 9/1964 Drott .............................. 280/475 X

*Primary Examiner*—John A. Pekar
*Attorney, Agent, or Firm*—Marcus L. Bates

[57] ABSTRACT

A remote actuator and interlock for a trailer hitch of the type having a main body, a ball receiving socket at one end of the main body with the other end of the main body being attachable to the end of a trailer. A pivotal member is hinged at the ball receiving socket end of the hitch. The main body and the pivotal member form hinged sections and the socket is formed jointly in the two hinged sections. A collar is reciprocatingly received about the main body and positioned to releasably receive the free marginal end of the pivotal member therein to thereby releasably latch the hinged sections together so that a ball can be captured therewithin. A remote actuator with interlock is mounted to the hitch apparatus by which the hinged sections are forced together and thereafter the collar is moved into the latched position over the hinged sections. The remote actuator includes a control lever pivotally mounted for movement respective to said main body. An actuator means is connected to be moved in response to movement of the control lever, and in response to extension and retraction of the jack device. The actuator means is positioned for engaging and retracting the pivotal member into aligned position to enable the collar to be received about the marginal free end thereof. This allows the hitch to be positioned in aligned relationship respective to a ball therefor, the collar moved into a retracted position, the pivotal member engaged by the actuator means and thereby moved into a retracted position, whereupon the collar is released and captures the marginal end of the pivotal member and retracted about a ball. Retracting the jack locks the remote actuator in the closed position.

19 Claims, 3 Drawing Sheets

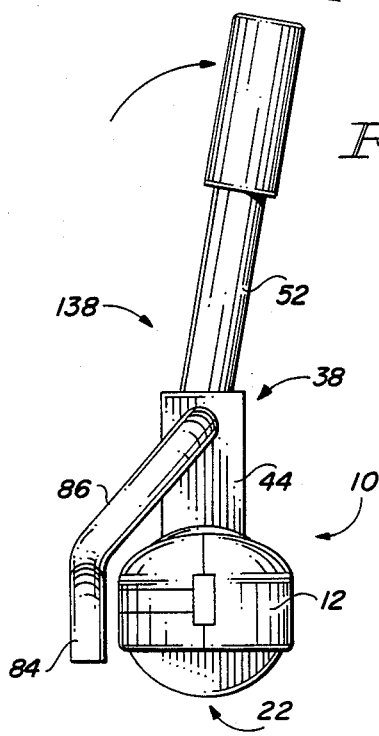
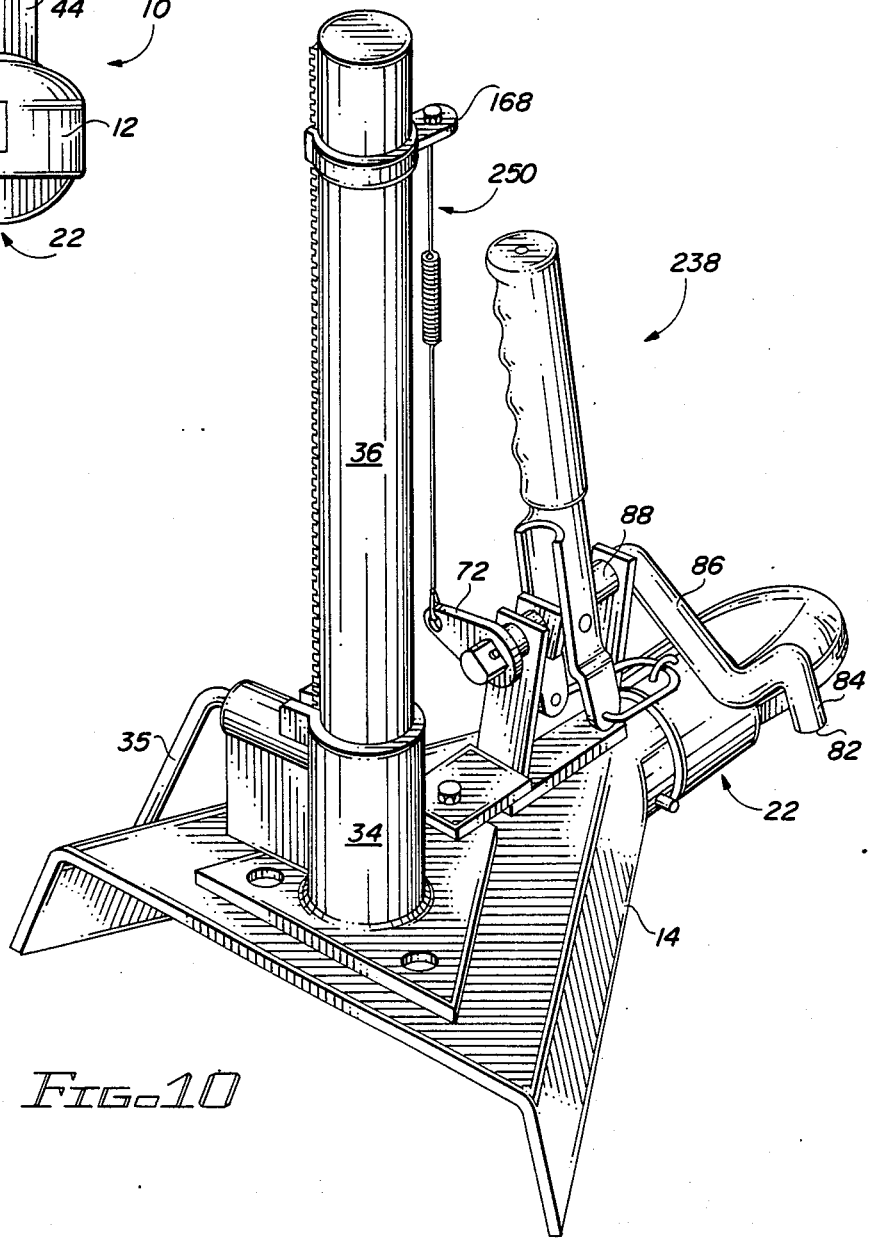

REMOTE OPERATED HITCH APPARATUS WITH SAFETY INTERLOCK

BACKGROUND OF THE DISCLOSURE

In my copending patent application Ser. No. 07/147,196 filed Jan.22, 1988, now U.S. Pat. No. 4,804,204; issued: Feb. 14, 1989 of which this patent application is a continuation-in-part, there is disclosed a trailer hitch of the type having a ball and socket connection wherein the socket expands to receive the ball and contracts to capture the ball, with there being a spring urged collar securely locking the socket components together, similar in some respects to the well known hitch shown by Jacobs 1,927,591.

This type hitch is very popular but has a tendency to pinch one's fingers between the coacting parts of the hitch as they attempt to connect the ball and socket therefor into operative or inoperative relationship.

Others have realized the dangers involved in this dilemma and have proposed remotely actuating the spring loaded collar, as evidenced by the patent to Nyman 4,157,190 and the patent to Pierce 4,133,553. My above mentioned copending patent application overcomes many of the objections to these previous hitches by the provision of a remote actuated linkage mounted to form a closing device on the front portion of the cap and body of the hitch so that after the ball has been received within the ball cavity, the hitch can be remotely actuated into the closed position and thereafter the collar is moved into the latched position.

It is astonishing, but true, that almost everyone, at one time or another, has forgotten to close the cap and body of the hitch after the ball has been received within the ball cavity. This usually occurs after the trailer jack has lowered the hitch onto the ball, otherwise one would simply drive away and leave the trailer wherever it was standing.

It would be desirable to have made available some sort of apparatus associated with a hitch, such as seen in my above mentioned patent application Ser. No. 07/147,196, now U.S. Pat. No. 4,804,204, that is automatically controlled in such a manner that it can be fastened to and unfastened from a ball without ever having to bring the fingers of one's hand into close proximity of the ball, the socket parts, or the collar. It would also be worthwhile for such an apparatus to be automatically actuated by the trailer jack in a manner which makes it unlikely for one to forget to properly fasten the hitch and which makes it difficult to release the hitch until the jack has been extended. Apparatus that enables this desirable goal to be achieved is the subject of the present invention.

SUMMARY OF THE INVENTION

Improvements in a remote actuator apparatus for a trailer hitch having a jack which is extended to support the tongue end of the trailer. The actuator apparatus can be retrofitted to various prior art hitches, especially of the type comprising an elongated body member that is provided at one end thereof with a semi-spherical socket, a complimentary pivotal socket member hinged to the elongated body member at the forward end of the members, and a spring urged sleeve slidably mounted on said body member for engagement over a marginal free end said pivotal socket member, thereby latching the pivotal socket member to the body member, and capturing a ball within the socket formed by the two members. The apparatus includes an interlock that prevents release of the ball from the socket when the jack is retracted.

The remote actuator of this invention, in order to release the hitch, slidably retracts the collar, thereby releasing the pivotal member, whereupon the ball is released from captured relationship respective to the socket. The jack must be extended at this time in order for the interlock to free the pivotal member.

The remote actuator, when used to close the hitch, retracts the collar and then forces the pivotal member into retracted configuration, whereupon subsequent release of the collar captures the free end of the pivotal member therewithin, thereby connecting the ball and hitch together. Then the jack can be retracted whereupon the interlock retains the pivotal member in the closed position.

The remote actuator includes a control lever pivotally mounted respective to the main body member for movement in a longitudinal and lateral direction. The lever is also connected to the collar for slidably retracting the collar when the lever is moved longitudinally. The lever is connected to move a curved actuator which engages and moves the pivotal member laterally into retracted configuration when the lever is moved laterally. The interlock is connected to urge the pivotal member into the closed position when the jack is retracted.

In one form of the invention, a jack is positioned adjacent to the hitch, and a toggle interconnects part of the jack and pivotal member in a manner whereby the control lever is pivotally moved automatically to the closed or opened position whenever the jack is manipulated to lower or raise the hitch in a downward or upward direction.

Accordingly, lateral movement of the lever pivotally moves the curved actuator laterally and into engagement with the pivotal hitch member, thereby forcing the pivotal member to be retracted against the main body and into a position to receive a marginal end of the collar over a marginal free end of the pivotal hitch member, thereby latching the hitch in the closed configuration.

The remote actuator further includes means by which said lever is pivotally mounted for longitudinal movement respective to the hitch. A linkage is attached to said lever and engages and retracts the collar against a collar spring so that the pivotal hitch member is either released or captured during removal and attachment of the hitch apparatus to a ball.

In one specific embodiment of the invention, a control lever is provided with a yoke which is pivotally mounted to a shaft, with the shaft being mounted for axial rotation to a mount fixture. The mount fixture is retrofitted to a vertical lug located on the main body of the hitch apparatus. A retracting link interconnects the pivotal end of the yoke to the collar so that forward movement of the control lever forces the collar rearwardly into a retracted position thereby releasing the pivotal hitch member from the collar. The shaft is also attached to a curved actuator having a free end extending into proximity of the free end of the pivotal hitch member. Accordingly, lateral movement of the control lever rotates the shaft which in turn pivotally moves the curved actuator into engagement with the pivotal hitch member causing the pivotal hitch member to be forced into a retracted configuration, whereupon movement of the control lever in a rearward direction moves the retracting link and releases the spring loaded collar which moves forward and captures the free marginal end of the retracted pivotal hitch member therewithin, thereby connecting the hitch to the ball.

A primary object of the present invention is the provision of a remote actuator which can be retrofitted to a prior art type trailer hitch to enable the component parts of the hitch to be remotely manipulated by a single control lever.

Another object of the invention is to provide a remote actuator with interlock for connecting and disconnecting a prior hitch to a ball by manipulating a single lever in a longitudinal and a lateral direction respective to the longitudinal axis of the hitch.

A further object of this invention is the provision of a remote actuator that is interlocked with a jack device by which a prior art hitch can be connected and disconnected from a ball, comprising a control lever mounted to the hitch apparatus in a manner to slide a collar of the hitch into a released position and which enables the hitch to be connected by remotely forcing a pivotal member of the hitch into a retracted position and thereafter releasing the collar over the pivotal hitch member only when the jack is in the appropriate position.

A still further object of this invention is the provision of a remote actuator interlocked with a jacking device which is attachable to a prior art hitch of the type having a slidable collar which releases a hinged socket member and which thereafter can be used for forcing the hinged socket member into a retracted position whereupon the collar is then moved over the end of the pivotal member and places the hitch into mounted relationship respective to the ball.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 3 is a broken, top plan view of the apparatus disclosed in FIGS. 1 and 2, with some parts being removed therefrom;

FIG. 4 is an enlarged, partially disassembled view that shows the improvement of the present invention removed from the hitch and jack of FIGS. 1-3;

FIG. 5 is a broken, front, perspective view of an alternate embodiment of the apparatus disclosed in the figures;

FIGS. 8 and 9 are front elevational views of the apparatus disclosed in some of the foregoing figures and shown in different operative configurations; and, FIG. 10 is a rear view showing another embodiment of the apparatus seen in FIG. 4.

DETAILED DESCRIPTION OF THE PREFERRED EMBODIMENTS

Figure 1:
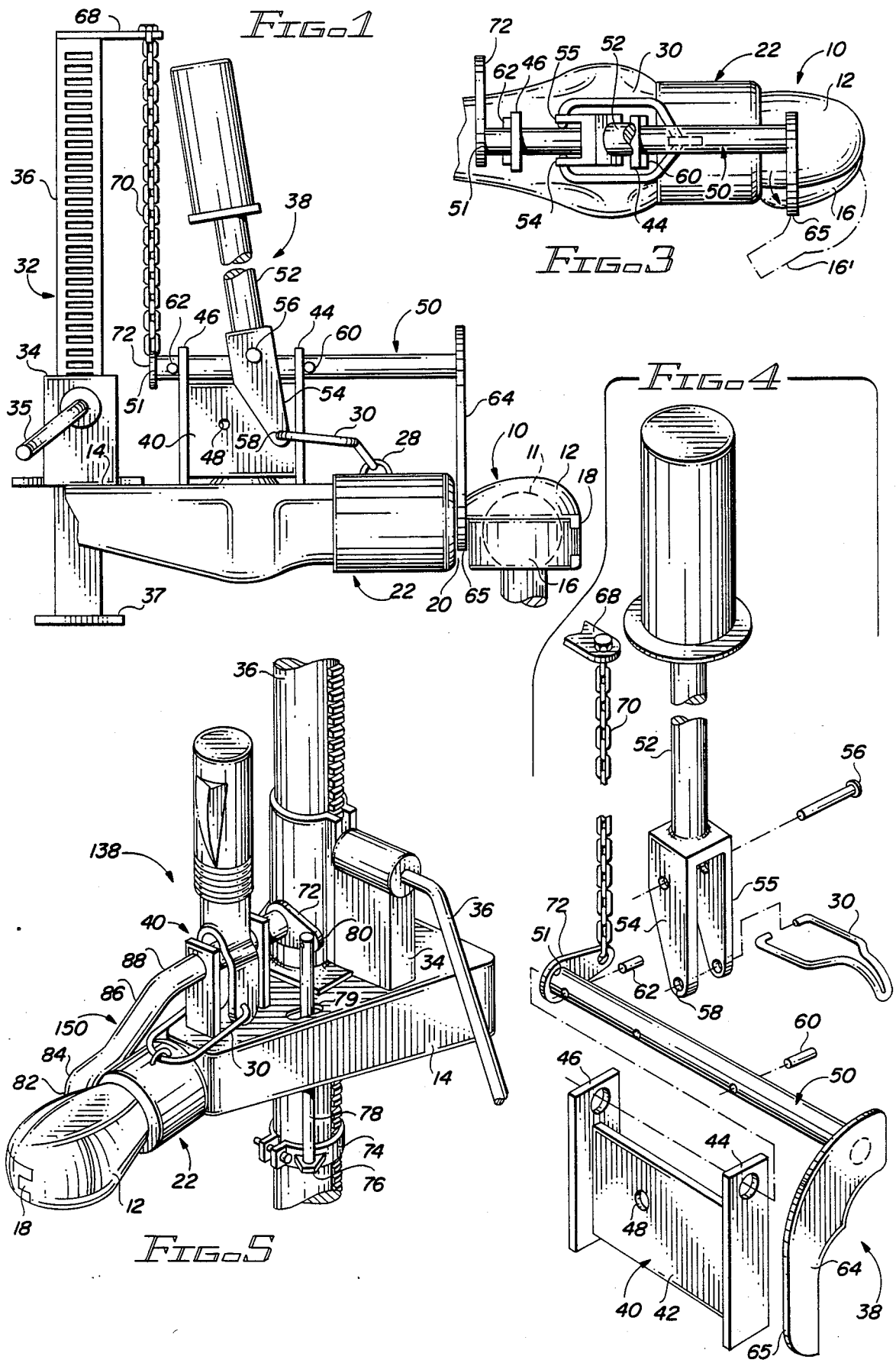
FIG. 1 is a broken, side elevational view of the present invention shown in combination with a prior art trailer hitch.
Figure 2:
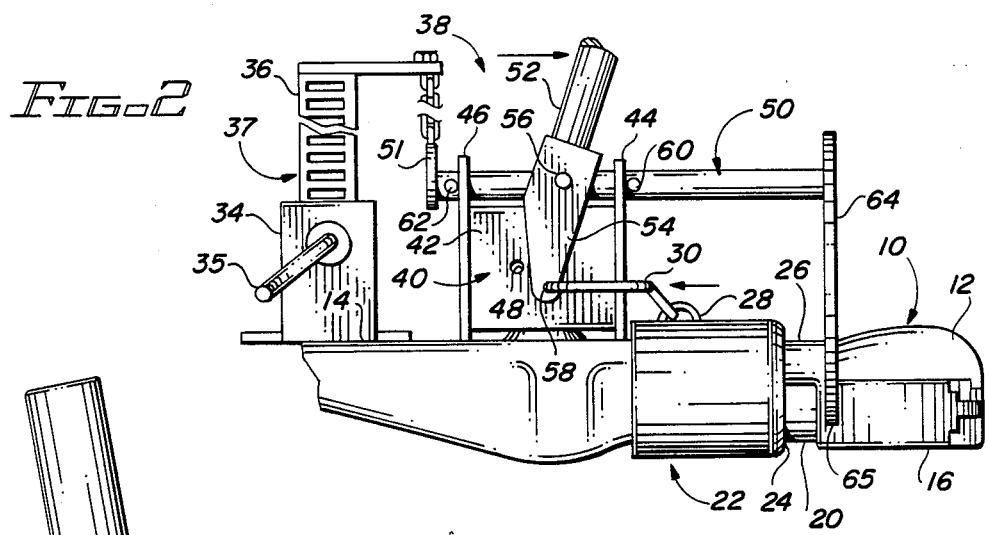
FIG. 2 is a fragmentary, side elevational view that shows FIG. 1 in an alternate position of operation.
Figure 6:
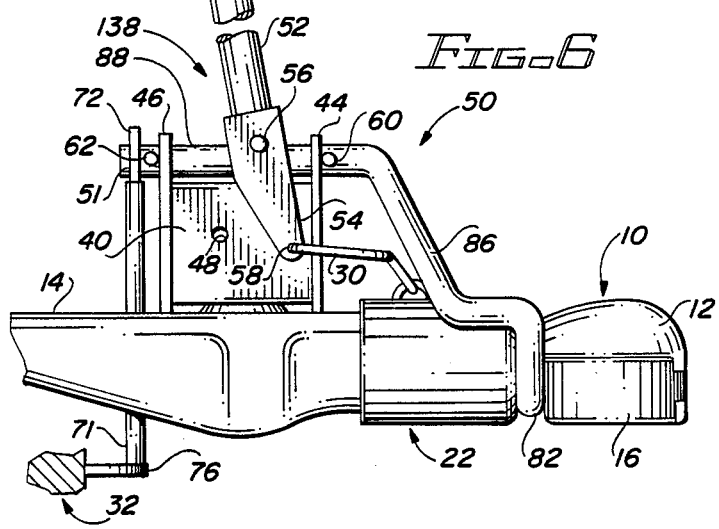
FIGS. 6 and 7 are side elevational views of the embodiment of FIG. 5 and shown in alternate positions of operation.
Figure 7:
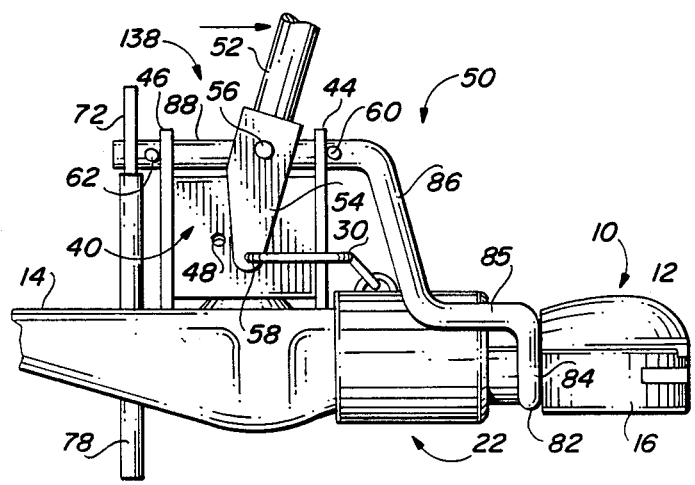

In FIG. 1 of the drawings, there is disclosed a prior art hitch 10 having a main body 12 for connection to a ball 11 which may be mounted on the rear of a vehicle, for example. The hitch has a tongue 14 at the rear end thereof which is opposed to a pivotal releasing member 16 which is hinged to the main body 12 at the forward end 18 thereof. A medial part of the main body and the pivotal releasing member is reduced in diameter at 20 for reciprocatingly receiving a spring loaded collar 22 thereon in the illustrated manner of FIGS. 1 and 2. The marginal free end 24 of the pivotal releasing member is captured by the forward marginal end of the collar in a well known manner. A reduced diameter part 26 of the main body 12, which is cylindrical in crosssection, provides a working area for the collar 22. A formed eyelet 28 provides a connection means for a retracting link 30. A conventional jack device 32 having gear box 34 operated by handle 35 raises and lowers rack 36. A remote actuator 38 has the illustrated lever that can be manipulated in a pivotal manner in order to move the collar 22 in a reciprocating manner, as will be more fully discussed later on.

FIGS. 1-4 set forth details of one form of an interlock 68-72 used in combination with a remote actuator 38 made in accordance with the present invention. The remote actuator 38 and interlock 68-72 can be retrofitted to the prior art hitch 10 set forth in the figures of the drawings as will be more fully appreciated later on as this disclosure is more fully digested.

In FIGS. 1 and 4, there is disclosed a mount fixture 40 having a central web 42 which terminates at the opposed sides thereof in fixed relationship respective to a pair of spaced perpendicular plate members 44 and 46.

A rotatable shaft 50 has a rear end 51 that can be telescoped through the illustrated aligned holes formed in the extension of the perpendicular end plates 44, 46 in the illustrated manner of FIGS. 1-4. A control lever 52 is affixed to the illustrated yoke. The yoke has spaced apart, downwardly depending legs 54, 55 which are connected together and to the lever 52 at the upper end thereof. The legs loosely receive the web 42 therebetween with the yoke pivot pin 56 being placed through the upper apertures of the yoke legs and the central aperture of the shaft 50. Collar retract link 30 is received in apertures 58 located at the free end of the yoke legs 54, 55. Forward and aft stop pins 60, 62 preferably are a hollow rolled pin that are indexed respective to the vertical end plates 44, 46 to align shaft 50 respective to the mount fixture so that the shaft is pivotally received by the fixture in properly oriented relationship respective to the remainder of the apparatus and to the collar and to the pivotal member.

A curved actuator 64 has a fixed end attached to the end opposite to shaft end 51, and a far end 65 which terminates in spaced relationship to the shaft 50 and which is brought into operative engagement respective to the pivotal hitch member 16.

The interlock of the present invention is a means for preventing release of the pivotal hitch member 16 whenever the jack 32 is retracted. The interlock includes rack plate member 68 affixed to the upper end of rack 36. Connector 70, shown as a chain, connects the rack plate 68 to the safety crank 72, which in turn is affixed to the rotatable shaft 50. Hence, the crank 72 is forced to rotate shaft 50 as jack rack 36 is elevated by gear box 34. This action urges far end 65 of curved actuator 64 against releasing member 16 of the hitch device, thereby urging the hitch into the closed configuration, where it is forced to remain until the jack is again cranked into the other position of operation. The alternate positions of the jack are referred to herein as the retracted position and the extended position.

IN OPERATION

In operation, with the jack 32 extended into contact with the ground at 37, the connector 70 is relaxed and allows the remote actuator 38 to manipulate member 16 and collar 22 of hitch 10 in the following manner: The control lever 52 is moved longitudinally in a forward direction toward the socket of the hitch thereby forcing the collar to move rearwardly against the collar spring (not shown) until the free end of the pivotal member is released from within the collar and pivots about the pivot pin at 18 thereby releasing any ball 11 from the socket that may have been captured therein. This manipulative exercise enables a person to release the prior art hitch 10 from a ball 11 without the necessity of placing any part of his body in proximity of the moving parts of the hitch apparatus.

In order to connect the hitch to a ball, the control lever 52 is moved toward the socket, thereby moving the retract link 30 which in turn reciprocates the collar 22 in a rearward direction against its spring biasing means. At this time, the jack is extended, the connector is relaxed, and the socket of the main body 12 should be nearly resting on a suitable ball 11. Next, while continuing the forward pressure on the control lever 52, the control lever is moved laterally in a clockwise direction when viewed from the rear, causing the end 65 of the curved actuator 64 to engage and move the pivotal hitch member 16 from the extended position of FIG. 2 into the retracted position of FIG. 1. The control lever 52 is held in the lateral position to maintain pressure against the pivotal hitch member 16 and the control lever is simultaneously moved rearwardly thereby allowing the collar spring to force the collar 22 to reciprocate forwardly and thereby receive a marginal terminal end of the pivotal member within the collar which locks the apparatus in the latched position of FIG. 2. The control lever can now be released and the rack 36 of jack 32 cranked into the retracted position of FIG. 1. This action places tension in connector 70, which urges safety crank 72 in a closed or clockwise direction. This action urges the member 64 against hitch member 16. It is not possible for the hitch 10 to be opened at this time so long as the jack 32 is retracted because of the cooperative action of the interlock 68–72.

THE SECOND EMBODIMENT

FIGS. 5–9 show an alternant embodiment of the present invention. In FIGS. 5–9, there is disclosed a remote actuator 138 made in accordance with the present invention. The remote actuator includes an interlock by which the remote actuator 138 is securely positioned in the closed position whenever the jack apparatus 32 is retracted. Rack 36 has a clamp 74 affixed to the lower end of rack 36. Foot 76 supports one end of connector 78, while the opposed end thereof is pinned at 80 to the safety crank 72. Hence, upward movement of rack 36 rotates the curved actuator 82–88 into the closed position respective to the main body 12 of the hitch apparatus. Pivot bolt 56 pivotally mounts the yoke 54 to the horizontal marginal end 88 of the curved actuator. The actuator has a free terminal end 82 at the vertical marginal terminal end 84 and marginal medial lengths 85, 86, 88. The inclined medial length 86 properly positions the actuator part 84 for engagement with hitch member 16. The handle 52 is affixed to the curved actuator by means of the horizontal pin 56 in the same manner of FIGS. 1–4.

The curved actuator therefore has a free lower terminal end 82 spaced from upper actuator end 88 at safety crank 72. This configuration places the curved actuator below the upper surface of the hitch 10 so that should the towing vehicle accidentally back over the hitch, it will ride over the parts 82–85 and reduce the potential damage to the hitch.

As seen in the opposite end view of FIG. 10, a spring loaded cable 250 is connected at the opposed ends thereof to safety crank 72 and rack plate member 168. The spring loaded cable urges safety crank 72 in a clockwise direction thereby moving the curved actuator part 84 against the releasing member 16.

Figure 8:
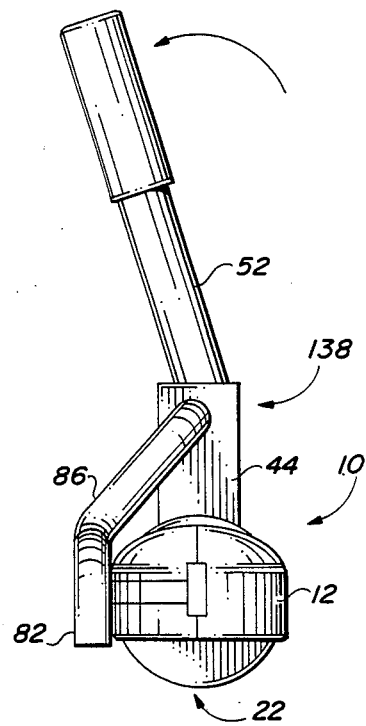

As seen in the front views of FIGS. 8 and 9, the curved actuator part 84, 86 is pivotally moved about the axis of part 88 as the handle 52 is moved laterally. This causes the inner surface 84 of the curved actuator to bear against the pivoted hitch member 16 and force the member 16 into the retracted position. At this time, the handle 52 should be in the forward position, causing the inner edges of the yoke legs to move the link 30 and move the collar in a reciprocatory manner until the end of the collar is free of the pivotal member 16. After both the collar 22 and the member 16 have been retracted by use of the handle 52, the handle can be moved aft, thereby permitting the yoke to release the collar so that the collar moves forward and is received about the marginal free end of the pivotal member 16. Next, the jack is raised and this places the spring loaded connector under tension, whereby the hitch is not apt to be inadvertently released while the jack is retracted.

I claim:
1. A trailer hitch of the type having a main body, a ball receiving socket at one end of the main body and the other end of the main body being attachable to the end of a tongue, for example; a jack device adjacent the main body that is extensible to support the trailer near the tongue; a pivotal member, hinge means at the ball receiving socket end by which said main body and said pivotal member form hinged sections; said socket is formed jointly in said hinged sections; a collar reciprocatingly received about said main body and positioned to releasably receive the free marginal end of said pivotal member therein to thereby releasably latch the hinged sections together so that a ball can be captured therein; the improvement comprising:
   a remote actuator by which the hinged sections are forced together to enable the collar to be moved into the latched position; said actuator includes a control lever, means pivotally mounting said control lever for movement respective to the main body; actuator means connected to be moved in response to movement of said control lever, said actuator means being positioned for engaging and retracting the pivotal member into aligned position to enable said collar to be received about the marginal free end thereof; and an interlock by which said actuator means is moved against the pivotal member when the jack device is extended; whereby, the hitch can be positioned in aligned relationship respective to a ball therefor, the collar moved into a retracted position, the pivotal member engaged by said actuator means and thereby moved into a retracted position, whereupon the collar is released and captures the marginal end of the pivotal member with the hinged sections being retracted about a ball.

2. The improvement of claim 1 wherein said actuator means is an elongated arm having one end pivotally connected to the main body and a free end mounted to move against the pivotal member and force the pivotal member laterally against the main body and into the retracted configuration.

3. The improvement of claim 1 wherein the hinge is a vertical pin that mounts the pivotal member to swing in a horizontal plane; the pivotal member has a reduced thickness at the free marginal end thereof that is engaged by the free marginal end of said actuator means and which is enclosed by the end of the collar.

4. The improvement of claim 1 wherein said control lever is mounted for lateral and longitudinal movement; means connected to said lever by which longitudinal movement thereof forces the collar to retract and thereby release the free end of the pivotal member therefrom; while lateral movement of said control lever forces said actuator means into operative engagement with the pivotal member.

5. The improvement of claim 1 wherein said actuator means is directly connected to be moved by said interlock in response to movement of the jack.

6. The improvement of claim 1 wherein said control lever is mounted for longitudinal and lateral movement respective to the longitudinal axis of the main body, means by which said control lever, when moved longitudinally, retracts the collar whereby said control lever moves longitudinally to retract the collar and moves laterally to retract the pivotal member; and said control lever moves longitudinally to release the collar from the end of the pivotal member, said interlock moves said actuator means in response to movement of the jack.

7. The improvement of claim 1 wherein there is a lug on the main body, a mount fixture attached to the lug, said control lever is supported by said mount fixture, a retract link attached to the collar and to said lever for longitudinal movement, said actuator is moved laterally by lateral movement of said lever.

8. In a trailer hitch comprising a main body having a jack device for raising and lowering one end of a trailer; a hinge at one end of the hitch which is opposed to a shank at the other end thereof, a semispherical socket formed in the hinge end;

a pivotal member attached to the hinge for moving in a horizontal plane, a collar slidably received on the main body for capturing a free marginal end of the pivotal member therein; a semispherical socket formed in the pivotal member which cooperates with the socket of the main body to form a socket for releasably capturing a ball therein;

the combination with the hitch of a remote actuator and interlock by which the collar is retracted and the pivotal member is closed and thereafter the collar is extended to latch the pivotal member to the main body with a ball being captured within the socket; said remote actuator includes a control lever, mount means by which said control lever is mounted for pivotal movement to the main body, actuator means connecting said lever for moving the pivotal member into a retracted position respective to the main body, said interlock being connected to urge said actuator means against the pivotal member when the jack device is retracted and to release the pivotal member when the jack device is extended; whereby:

the collar can be slidably retracted, said lever pivoted to cause said actuator means to engage and move the pivotal member into retracted position, and the collar released to latch the pivotal member to the main body with a ball being captured within the socket when the jack device is in the extended position.

9. The combination of claim 8 wherein said remote actuator is an elongated arm having one end pivotally connected to the main body and a free end mounted to move against the pivotal member and force the pivotal member laterally against the main body and into the retracted configuration.

10. The combination of claim 8 wherein the hinge is a vertical pin that mounts the pivotal member to swing in a horizontal plane; the pivotal member has a reduced thickness at the free marginal end thereof that is engaged by the free marginal end of said actuator means and which is enclosed by the end of the collar; and, said remote actuator is connected to directly move said actuator means in response to movement of the jack device.

11. The combination of claim 8 wherein said control lever is mounted for lateral and longitudinal movement; means connected to said lever by which longitudinal movement thereof forces the collar to retract and thereby release the free end of the pivotal member therefrom; while lateral movement of the control lever forces said actuator means into operative engagement with the pivotal member; and, said interlock is connected to force said control lever laterally to the closed position when the jack device is retracted.

12. The combination of claim 8 wherein said control lever is mounted for longitudinal and lateral movement respective to the longitudinal axis of the main body, means by which said control lever, when moved longitudinally, retracts the collar whereby; said control lever moves longitudinally to retract the collar and moves laterally to retract the pivotal member; and said control lever moves longitudinally to release the collar from the end of the pivotal member; and, said interlock forces said control lever laterally to retract the pivotal member in response to retraction of the jack device.

13. The combination of claim 8 wherein there is a lug on the main body, a mount fixture attached to the lug, said control lever is supported by said mount fixture, a retract link attached to the collar and to said lever for longitudinal movement, said actuator means is moved laterally by lateral movement of said lever and by retraction of the jack device.

14. In a trailer hitch of the type having a main body, a ball receiving socket at one end of the main body and the other end of the main body being attachable to the end of a tongue, for example; a pivotal member, hinge means at the ball receiving socket end by which the main body and the pivotal member form hinged sections; the socket is formed jointly in the hinged sections; a collar reciprocatingly received about the main body and positioned to releasably receive the free marginal end of the pivotal member therein to thereby releasably latch the hinged sections together so that a ball can be captured within the socket; a jack device for raising and lowering a trailer; the improvement comprising:

a remote actuator and interlock for connecting and disconnecting the hitch to a ball and by which the hinged sections are forced together to enable the collar to be moved into the latched position; said remote actuator includes a control lever and actuator means, means pivotally mounting said control lever for movement respective to the main body; said actuator means being connected to be moved in response to movement of said control lever, said actuator means being positioned for engaging and retracting the pivotal member into aligned position to enable the collar to be received about the marginal free end thereof; means connecting said interlock and the jack device to prevent the pivotal member being moved into the released position when the jack device is extended; whereby, the hitch can be positioned in aligned relationship respective to a ball therefor, the collar moved into a retracted position, the pivotal member engaged by said actuator means and thereby moved into a retracted position only when the jack device is extended, whereupon the collar is then released and captures the marginal end of the pivotal member and retracted about a ball.

15. The improvement of claim 14 wherein said actuator means is an elongated arm having one end pivotally connected to the main body and a free end mounted to move against the pivotal member and force the pivotal member laterally against the main body and into the retracted configuration and said interlock directly connects the pivotal member to permit movement only when the jack is extended.

16. The improvement of claim 15 wherein the hinge is a vertical pin that mounts the pivotal member to swing in a horizontal plane; the pivotal member has a reduced thickness at the free marginal end thereof that is engaged by the free marginal end of the actuator means and which is enclosed by the end of the collar.

17. The improvement of claim 16 wherein said control lever is mounted for lateral and longitudinal movement; means connected to said lever by which longitudinal movement thereof forces the collar to retract and thereby release the free end of the pivotal member therefrom; while lateral movement of the control lever forces the actuator means into operative engagement with the pivotal member.

18. The improvement of claim 15 wherein there is a lug on said main body, a mount fixture attached to the lug, said control lever is supported by said mount fixture, a retract link attached to the collar and to said lever for longitudinal movement thereof, said actuator is moved laterally by lateral movement of said lever.

19. The improvement of claim 14 wherein said control lever is mounted for longitudinal and lateral movement respective to the longitudinal axis of the main body, means by which said control lever, when moved longitudinally, retracts the collar, whereby said control lever moves longitudinally to retract the collar and moves laterally to retract the pivotal member; and said control lever moves longitudinally to release the collar from the end of the pivotal member.

* * * * *